United States Patent [19]
Truchet

[11] Patent Number: 5,083,588
[45] Date of Patent: Jan. 28, 1992

[54] DEVICE, INCORPORATING ROTATING VALVES, FOR COUPLING PIPES

[75] Inventor: Gaston Truchet, Faverges, France

[73] Assignee: S.A. Des Etablissements Staubli (France), Faverges, France

[21] Appl. No.: 695,917

[22] Filed: May 6, 1991

[30] Foreign Application Priority Data

May 18, 1990 [FR] France .................. 90 06498

[51] Int. Cl.$^5$ .............................................. F16L 29/00
[52] U.S. Cl. .................. 137/614.02; 137/614.06; 137/637.05
[58] Field of Search .............. 137/614.01, 614.02, 137/614.05, 614.06, 637.05

[56] References Cited
U.S. PATENT DOCUMENTS 3,159,180 12/1964 Courtot et al. .................. 137/614.06
3,545,490 12/1970 Burrus ........................... 137/614.06
4,664,149 5/1987 Fremy ........................... 137/614.06

FOREIGN PATENT DOCUMENTS 1060202 6/1959 Fed. Rep. of Germany ........................ 137/614.05

Primary Examiner—John C. Fox
Attorney, Agent, or Firm—Dowell & Dowell

[57] ABSTRACT

This invention relates to a device, incorporating rotating valves, for coupling pipes, wherein the control mechanism (notched discs, fingers) associated with the valves of the two elements of the device, is arranged so that rotation of said valves, during approach of the two support plates, is effected sequentially, the second valve rotating the first in order to enable the first valve to move angularly thereafter, in either case without involving displacement along the axis of the device.

1 Claim, 8 Drawing Sheets

DEVICE, INCORPORATING ROTATING VALVES, FOR COUPLING PIPES

FIELD OF THE INVENTION

The present invention re unions and more particularly to coupling devices in which each of the two elements fixed to the ends of the pipes to be connected, is equipped with a substantially spherical valve member adapted to rotate on itself to pass from the position of opening to the position of closure, and vice versa, this movement being effected automatically by axial displacement of one of said elements with respect to the other.

BACKGROUND OF THE INVENTION

The construction of such a device remains relatively simply when the two valve members are disposed at a certain distance from each other and their rotation may consequently be controlled simultaneously. On the other hand, this does not apply when it is desired to avoid any risk of the conveyed liquid coming into contact with the outside environment due to the risks of pollution which would otherwise be created; in such a case, it is necessary that, in the position in which the elements are coupled, the semi-spherical protuberance of the valve of one of the elements be housed in a conjugate depression made in the wall of the other, and it will be understood that the interpenetration of the two parts of semi-spherical profile normally opposes any simultaneous movement of rotation of the two valves thus fitted.

In order to solve the problem thus raised, it is generally provided that the rotation of the valves in the course of the longitudinal movement for coupling, be preceded by an axial displacement or recoil of at least one of the two inside the body which contains it. It will be understood that, although such previous recoil thereafter allows simultaneous rotation of the two valves of the device, it causes the liquid to come into contact with certain of the parts of said device, consequently involving relatively complicated cleaning operations if it is desired to avoid any risk of internal pollution. In addition, it should be observed that the structures proposed are complex and increase the cost of the assembly.

It is an object of the present invention to overcome these drawbacks, with the aid of a coupling device of the type incorporating rotating valve members, which avoids the formation of any interior space capable of retaining a fraction of the conveyed fluid and which may consequently be cleaned simply by passing a fluid stream, without any dismantling of parts.

SUMMARY OF THE INVENTION

The invention essentially consists in arranging the control mechanism associated with the valve of each of the two elements of the device, so that the rotation of the two valves which follows the axial bringing together of said elements, occurs sequentially, one valve after the other, without any displacement along the axis of the elements.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
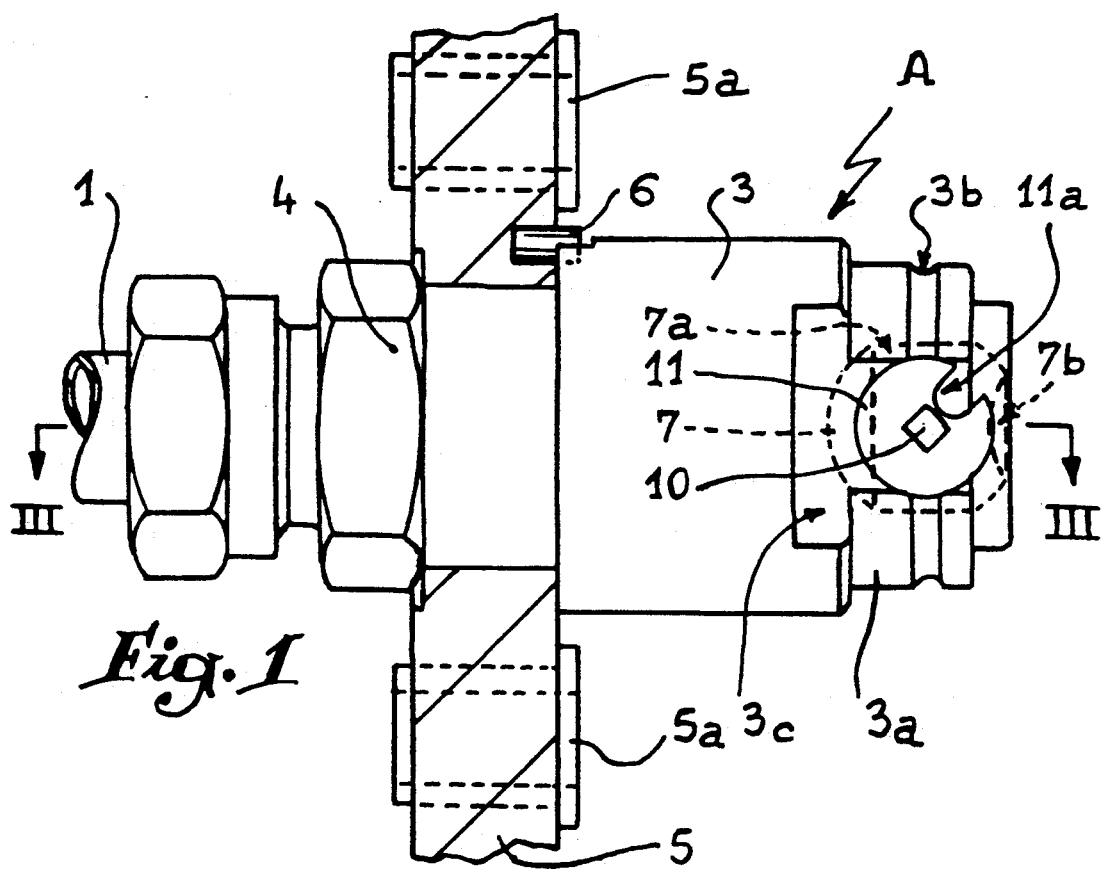
FIGS. 1 and 2 show the two elements of a coupling device according to the invention.
Figure 2:
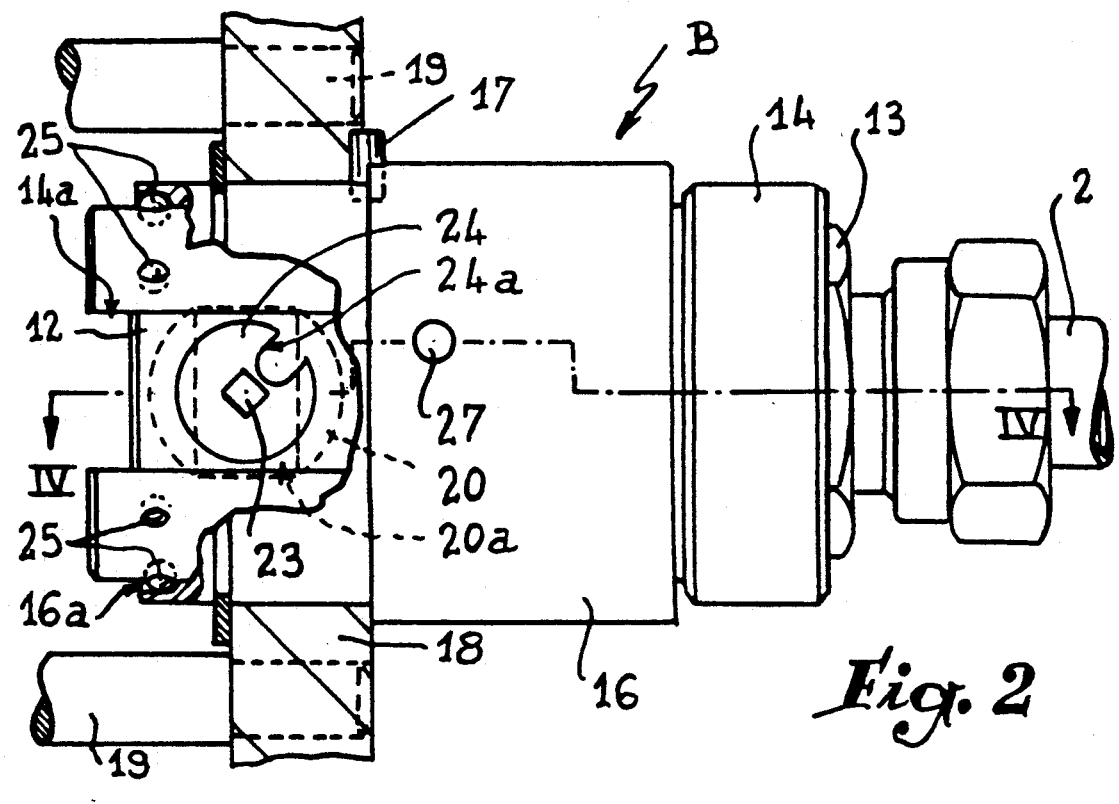

Referring now to the drawings, the coupling device conventionally comprises two elements A (FIG. 1) and B (FIG. 2) of which the body is arranged in the rear part to be fixed to the end of the two flexible pipes 1 and 2 to be coupled.

Figure 3:
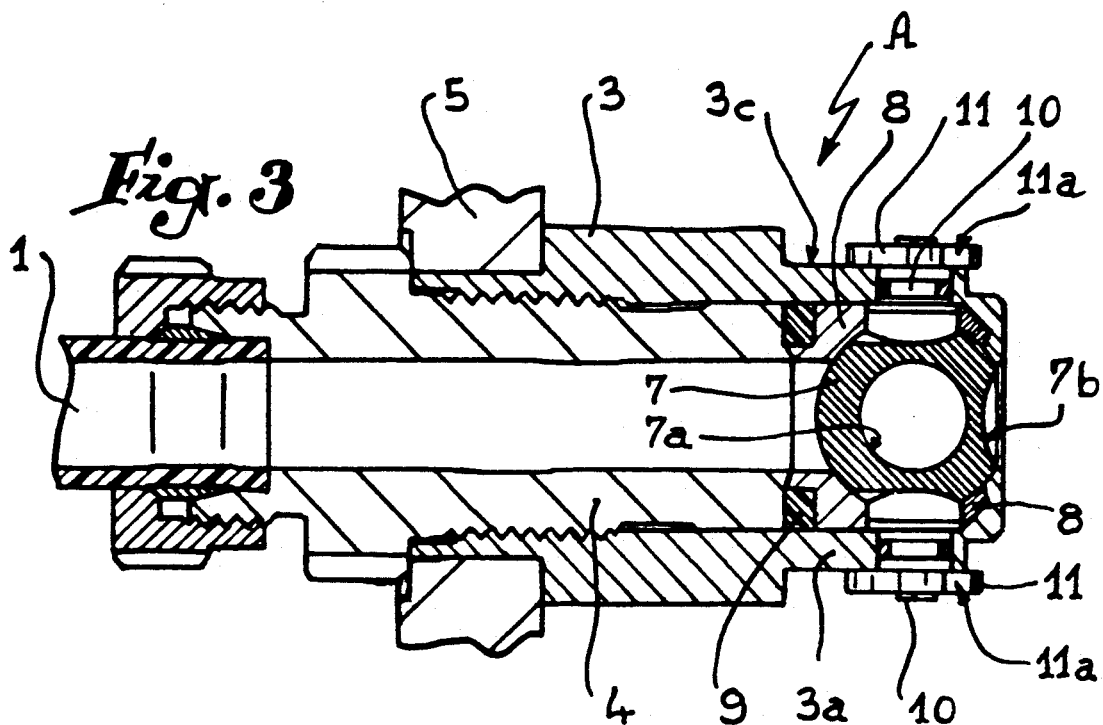
FIGS. 3 and 4 are axial sections along respective planes III—III (FIG. 1) and IV—IV (FIG. 2).

The body of element A (FIGS. 1 and 3) is formed by two tubular pieces 3 and 4 provided to be threaded in order to be assembled on each other by screwing, a support plate 5 equipped with guiding rings 5a being tightened therebetween. It will be noted that piece 3 comprises an index 6 engaged in a corresponding cavity in plate 5 in order to ensure angular location of the body 3-4 with respect to said plate.

Opposite the pipe 1, the body 3-4 contains a rotating valve 7 mounted between two seats 8 associated with a compensating joint 9. At two diametrically opposite points, this valve 7 comprises a recess in which is housed the end, in the form of a screwdriver, of a small transverse shaft 10 mounted tightly in a corresponding bore in the end of the piece 3. Each shaft 10 is provided with a control disc 11 with a notch 11a cut out therein. Of course, the valve 7 is traversed by a bore 7a, whilst its outer wall presents a depression 7b in the form of a semispherical dish whose radius is equal to the outer radius of the valve.

It should be observed that the valve 7 is housed in a part or nose 3a, of smaller diameter, of the piece 3 of body 3-4, which nose has an annular groove 3b hollowed out therein. The discs 11 are placed at the level of two flat portions 3c diametrically opposite each other on the nose 3a with the result that they do not determine any projection on the latter.

Figure 4:
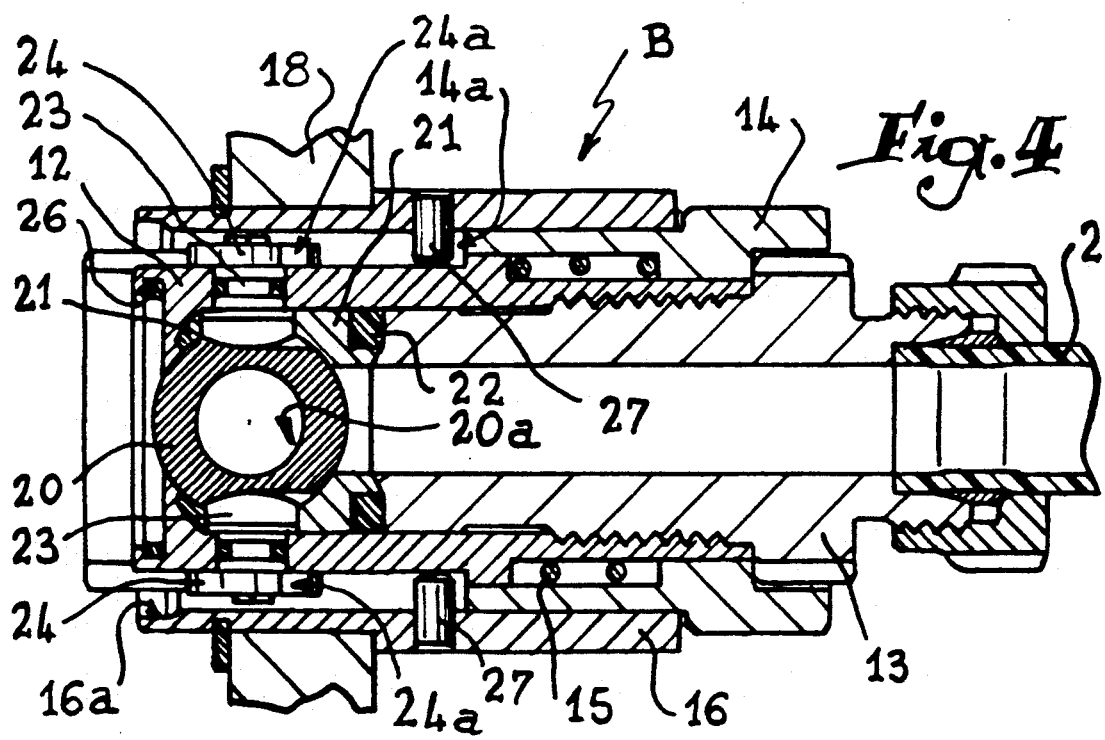

The body of element B (FIGS. 2 and 4) presents a more complex structure. In fact, although there are two tubular pieces 12 and 13 assembled by screwing, piece 12 is surrounded by a mobile ring 14 which a spring 15 tends to push rearwardly until it comes into abutment against an annular shoulder of the piece 13. The ring 14 is itself disposed inside a bush 16 fixed, with the interposition of an index 17 for location similar to that, 6, of element A, to a support plate 18 provided with two parallel rods 19 adapted to slide inside the guides 5a of the plate 5.

Body 13-14 of element B contains a rotating valve 20 pierced with a bore 20a, like valve 7, and mounted, like the latter, between two seats 21 associated with a compensating joint 22. It is likewise provided with two shafts 23 equipped with control discs 24 having a notch 24a cut out therein. These two discs 24 are disposed inside notched parts 14a of the ring 14, which projects forwardly of the bush 16 and comprises perforations adapted to form housings for balls 25, retained between the bush 16 and the outer wall of the tubular piece 12.

Immediately in front of the valve 20, this piece 12 is equipped with an O-ring 26. Furthermore, to the rear of the plate 18, the bush 16 bears two fingers 27 diametrically opposite each other and which project radially inside the notched parts of the ring 14.

Figure 5:
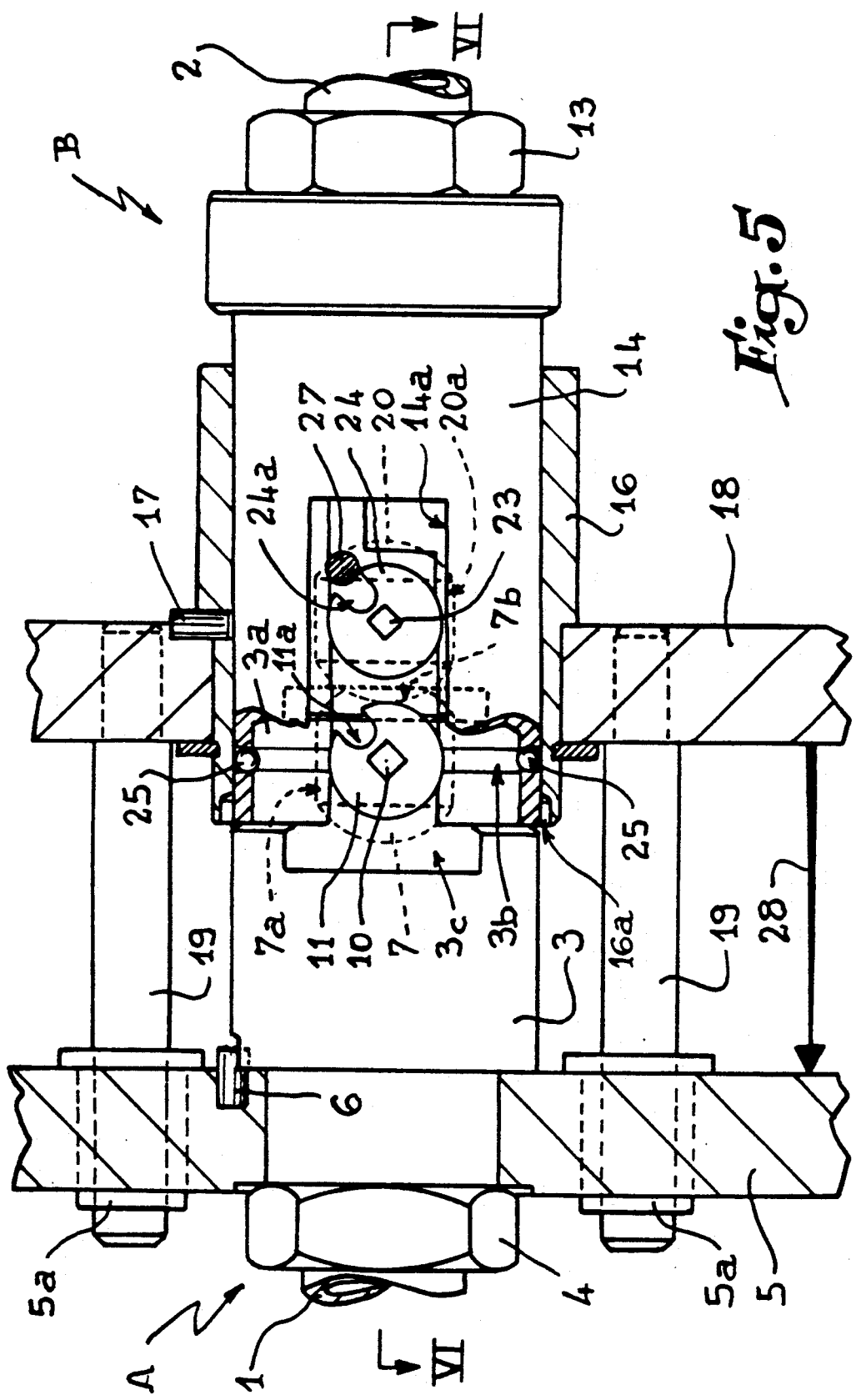
FIG. 5 shows the two elements fitted in each other in the locked position.

Before setting forth the functioning of the coupling device described hereinabove, it will be indicated that there is associated with the two support plates 5 and 18 a pneumatically, hydraulically or electrically actuated jack, of which the two members (body and piston) are respectively fixed to said plates in order to effect mutual bringing together or moving apart thereof. In order to simplify the following explanations, it will be assumed that plate 5 is fixed, with the result that it is plate 18 which is displaced transversely to its axis by the said jack, schematically represented in FIG. 5 by arrow 28.

Figure 6:
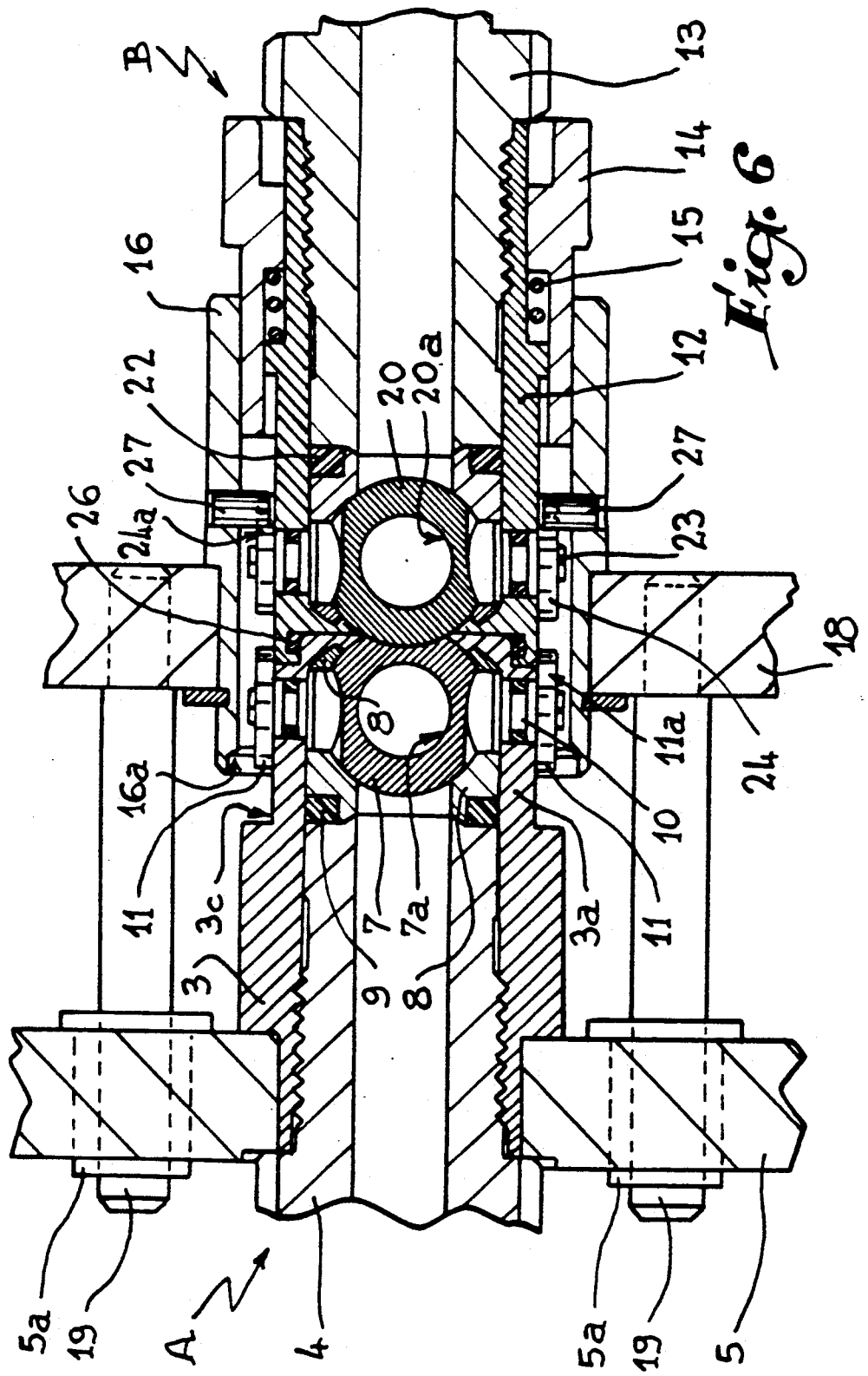
FIG. 6 is an axial section along plane VI—VI of FIG. 5.

The device being assumed to be in the position in which the two elements A and B are uncoupled, it will be understood that, when the jack 28 starts its return stroke, the ring 14 engages on the nose 3a of the body 3-4 of the element A, whilst the valve 20 fits partially in the recess 7b of valve 7. The balls 25, which were initially disposed at the level of the thinned opening 16a of the bush 16, are pushed forwardly by the shoulder formed in this opening, taking along ring 14, until they lie at the level of groove 3b of said nose 3a in which they are applied. Consequently, the two elements A and B of the device are axially locked on each other, in the manner illustrated in FIGS. 5 and 6, it being observed that the two valves 7 and 20 are still in the closed position.

Figure 7:
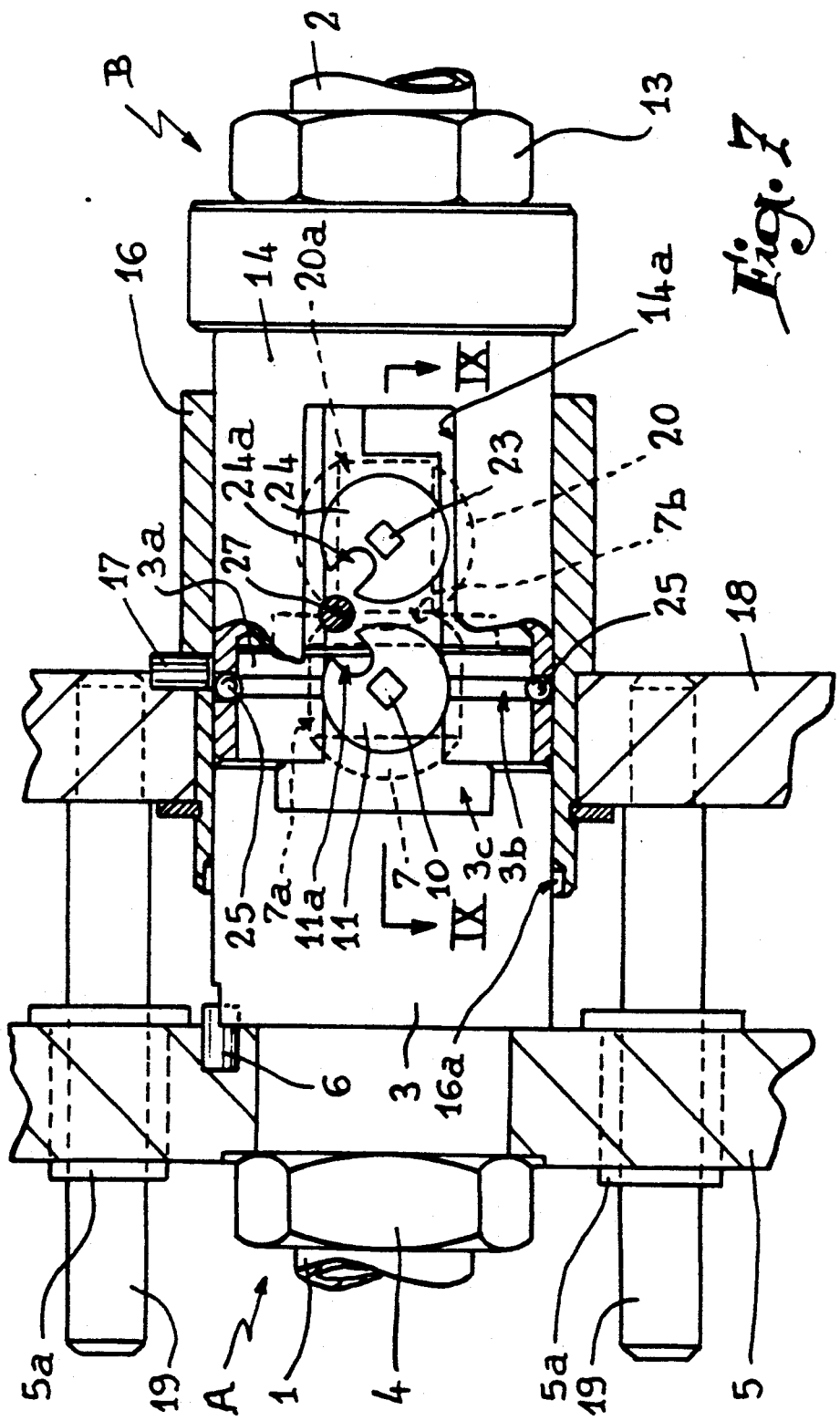
FIGS. 7 and 8 reproduce FIG. 5 in two successive phases of the process of opening of the valves.
Figure 8:
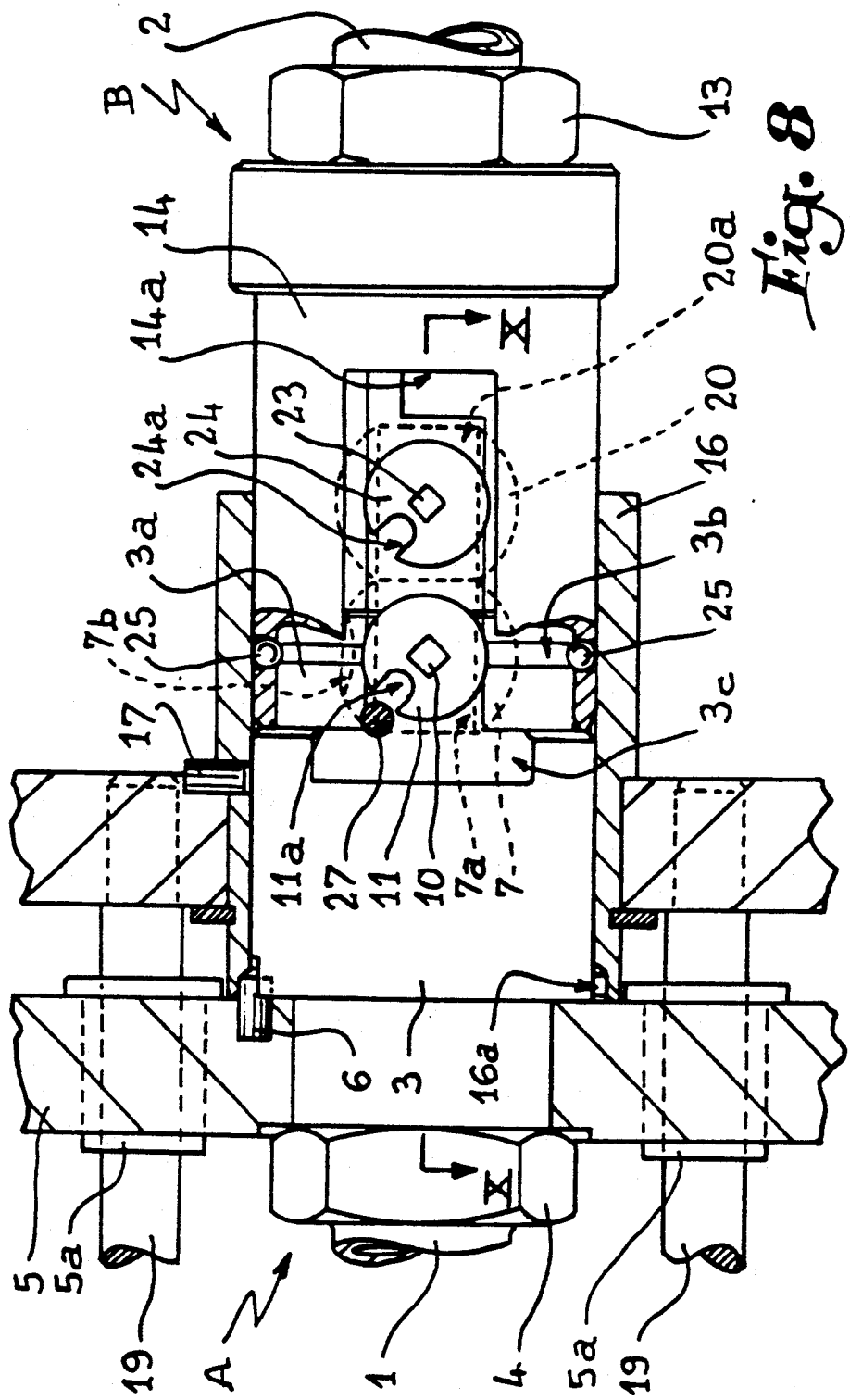
Figure 9:
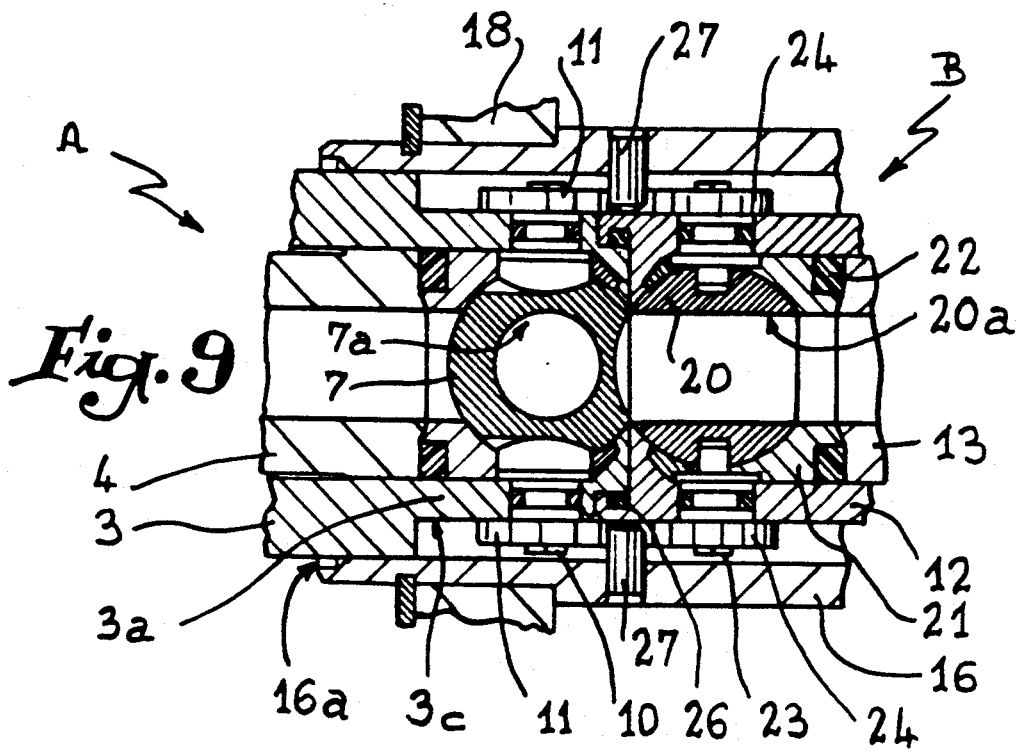
FIGS. 9 and 10 are axial sections in detail along respective planes IX—IX (FIG. 7) and X—X (FIG. 8).
Figure 10:
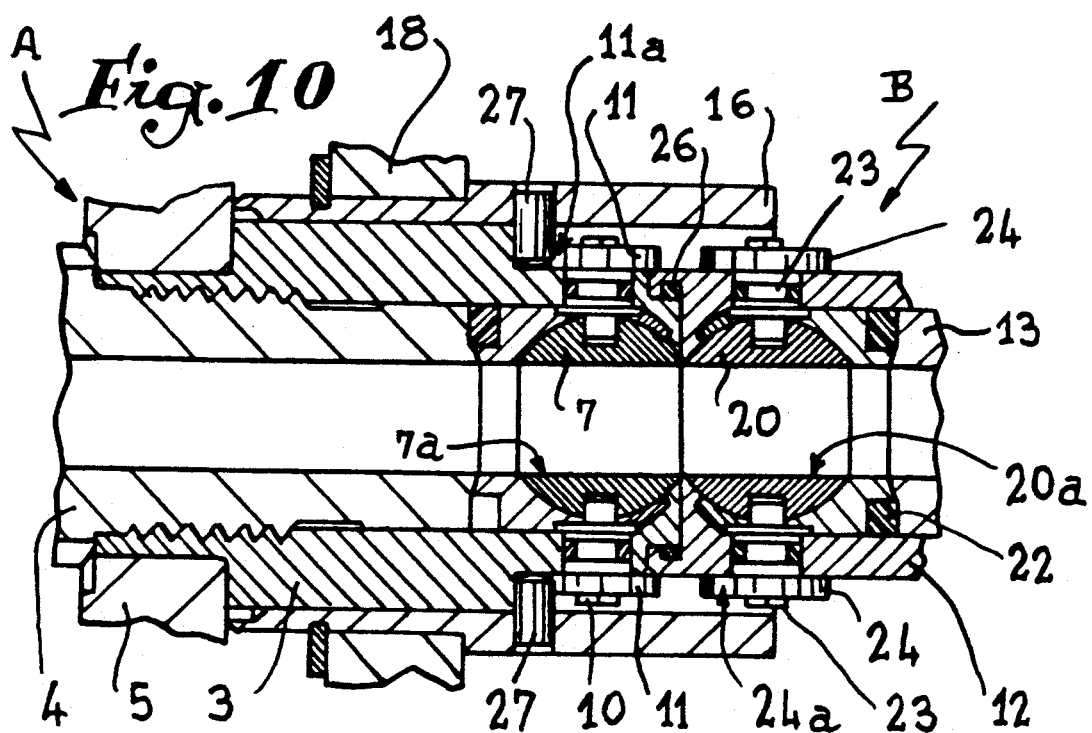

The continuing displacement of the bush 16 under the action of the jack 28 will cause the fingers 27 to engage in the notches 24a of the discs 24, then to drive the latter in rotation. Due to the presence of the depression 7b, the valve 20 may rotate on itself through an angle of 90°, finally taking the orientation of opening illustrated in FIGS. 7 and 9. Continuing their displacement, fingers 27 leave notches 24a and are introduced in notches 11a, with the result that they will ensure, in the same way, the control of the discs 11 associated with the valve 7; the spherical protuberance of this valve 7 is engaged in the opening of the bore 20a, with the result that said valve 7 is, in turn, free to pivot through 90° in order to take the open position shown in FIGS. 8 and 10.

The fluid which flows through the two pipes 1 and 2 may then pass through the coupling device, without loss of pressure and without coming into contact with any piece of said device other than the wall of the axial bores of bodies 3-4 and 12-13, the wall of seats 8 and 21 and the wall of bores 7a and 20a, none of these walls having any contact with the outside environment and being, in addition, capable of being cleaned by simple passage of fluid inside the device.

It goes without saying that uncoupling may be obtained by expanding jack 28 in order to move apart the two plates 5 and 18. The fingers 27 will successively control closure of valve 7, then valve 20; finally, the bush 16 returns to its initial position with its thinned opening 16a opposite the balls 25 which unlock the two elements A and B.

Figure 11:
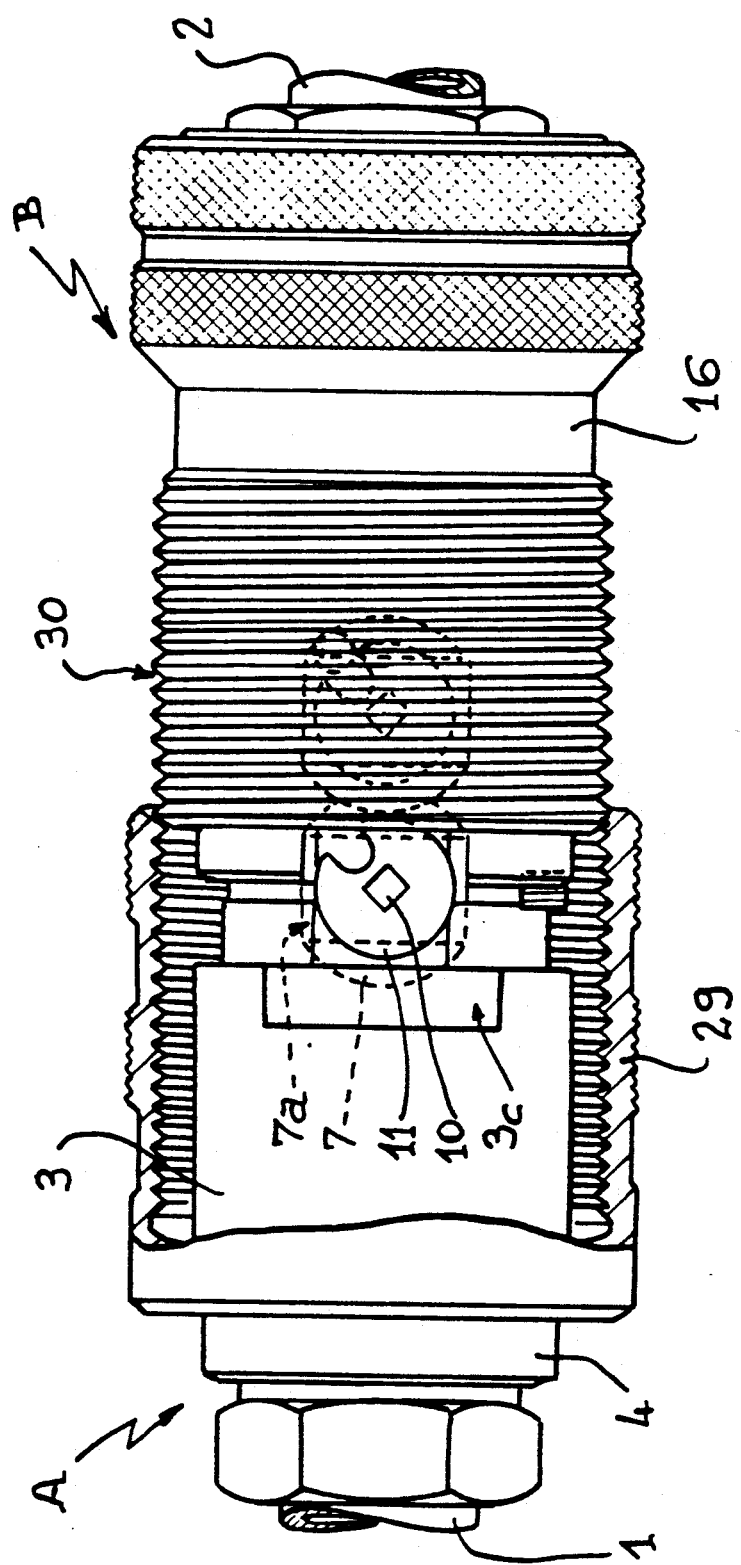
FIG. 11 illustrates a variant embodiment of the invention.

It will be readily understood that the invention may advantageously be implemented for producing manually actuated coupling devices. As illustrated in FIG. 11, it suffices, to that end, to provide element A with a threaded maneuvering ring 29 rotating on the periphery of piece 3 of the body 3-4, which ring 29 is adapted to cooperate with a threading 30 provided on the periphery of the bush 16, ensuring reciprocal displacement of the two elements, in one direction or in the other, depending on the direction of angular displacement imparted to said ring 29.

It must, moreover, be understood that the foregoing description has been given only by way of example and that it in no way limits the domain of the invention which would not be exceeded by replacing the details of execution described by any other equivalents.

What is claimed is:

1. In a device for coupling pipes, of the type comprising two elements which are equipped with means adapted to ensure locking thereof after axial fit and which contain rotating spherical valves associated with rotation control means which come into action so as to effect successive actuation thereof, one of these valves presenting a semi-spherical depression inside which is fitted the wall of the other valve when the two valves are in closed position, the control means comprise, on the one hand, at least one notched disc fast in rotation with each of the valves, and on the other hand, at least one actuation finger borne by a bush whose axial displacement during the coupling and uncoupling operations ensures sequential control of the rotating movement of the valves by the initial engagement of said finger in the notch of a first valve, then, after rotation of the latter through 90°, the subsequent engagement of this same finger in the notch of the second valve and the rotation of the latter through 90°.

* * * * *